(No Model.) 2 Sheets—Sheet 1.
S. J. SMITH.
GATE.

No. 517,366. Patented Mar. 27, 1894.

Witnesses
John C. Shaw
N. J. Riley

Inventor
Stansbury J. Smith
By his Attorneys.
C. A. Snow & Co.

(No Model.) 2 Sheets—Sheet 2.

S. J. SMITH.
GATE.

No. 517,366. Patented Mar. 27, 1894.

Witnesses
John C. Logan
H. H. Riley

Inventor
Stansbury J. Smith
By his Attorneys.
C. A. Snow & Co.

UNITED STATES PATENT OFFICE.

STANSBURY J. SMITH, OF PARIS, TEXAS.

GATE.

SPECIFICATION forming part of Letters Patent No. 517,366, dated March 27, 1894.

Application filed August 29, 1893. Serial No. 484,301. (No model.)

*To all whom it may concern:*

Be it known that I, STANSBURY J. SMITH, a citizen of the United States, residing at Paris, in the county of Lamar and State of Texas, have invented a new and useful Gate, of which the following is a specification.

The invention relates to improvements in gates.

The object of the present invention is to improve the construction of sliding gates, and to provide a simple and inexpensive one which may be readily operated to open and close it with a minimum amount of exertion on the part of the operator.

The invention consists in the construction and novel combination and arrangement of parts hereinafter fully described, illustrated in the accompanying drawings and pointed out in the claims hereto appended.

Figure 1:
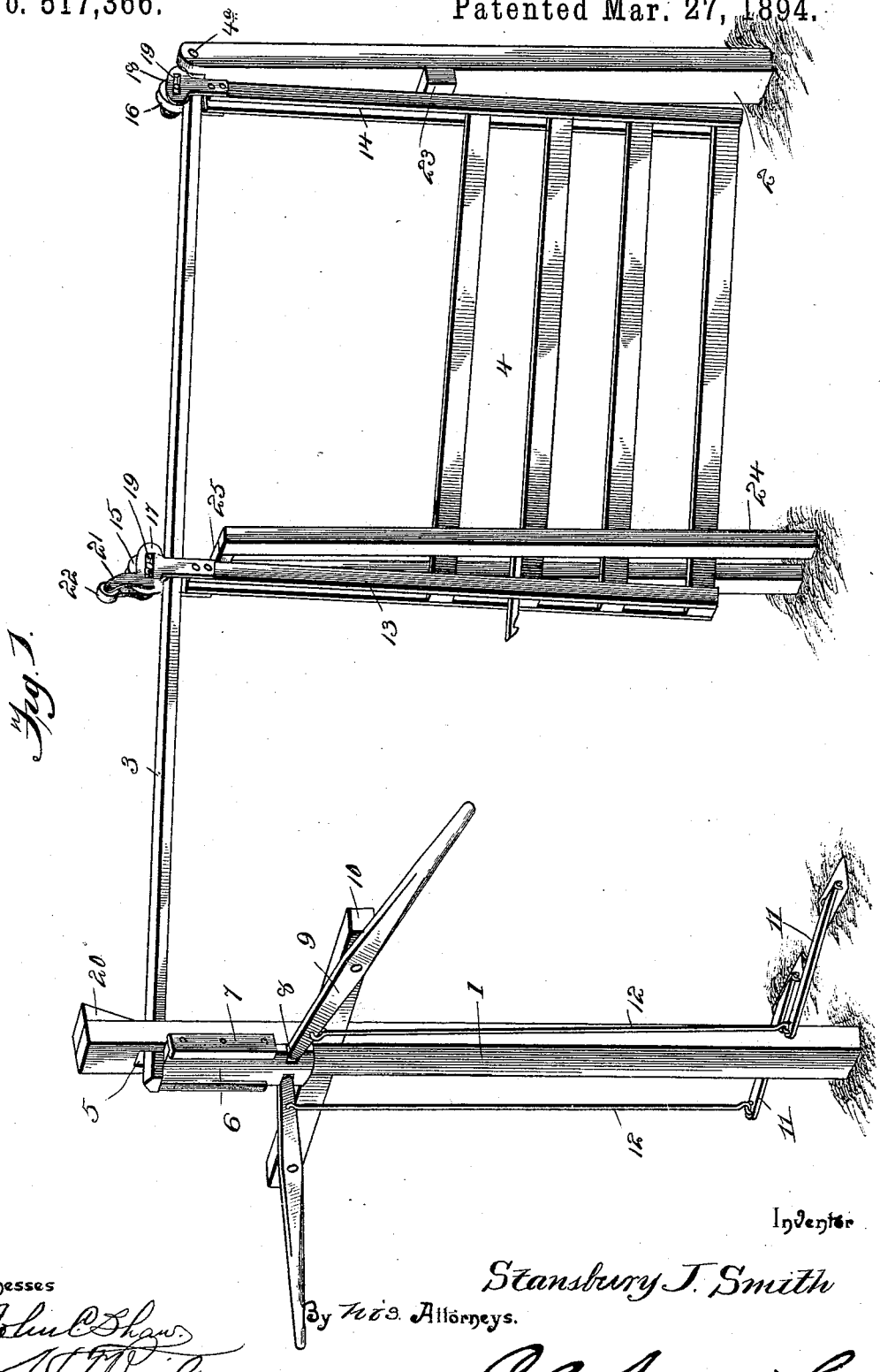
Figure 2:
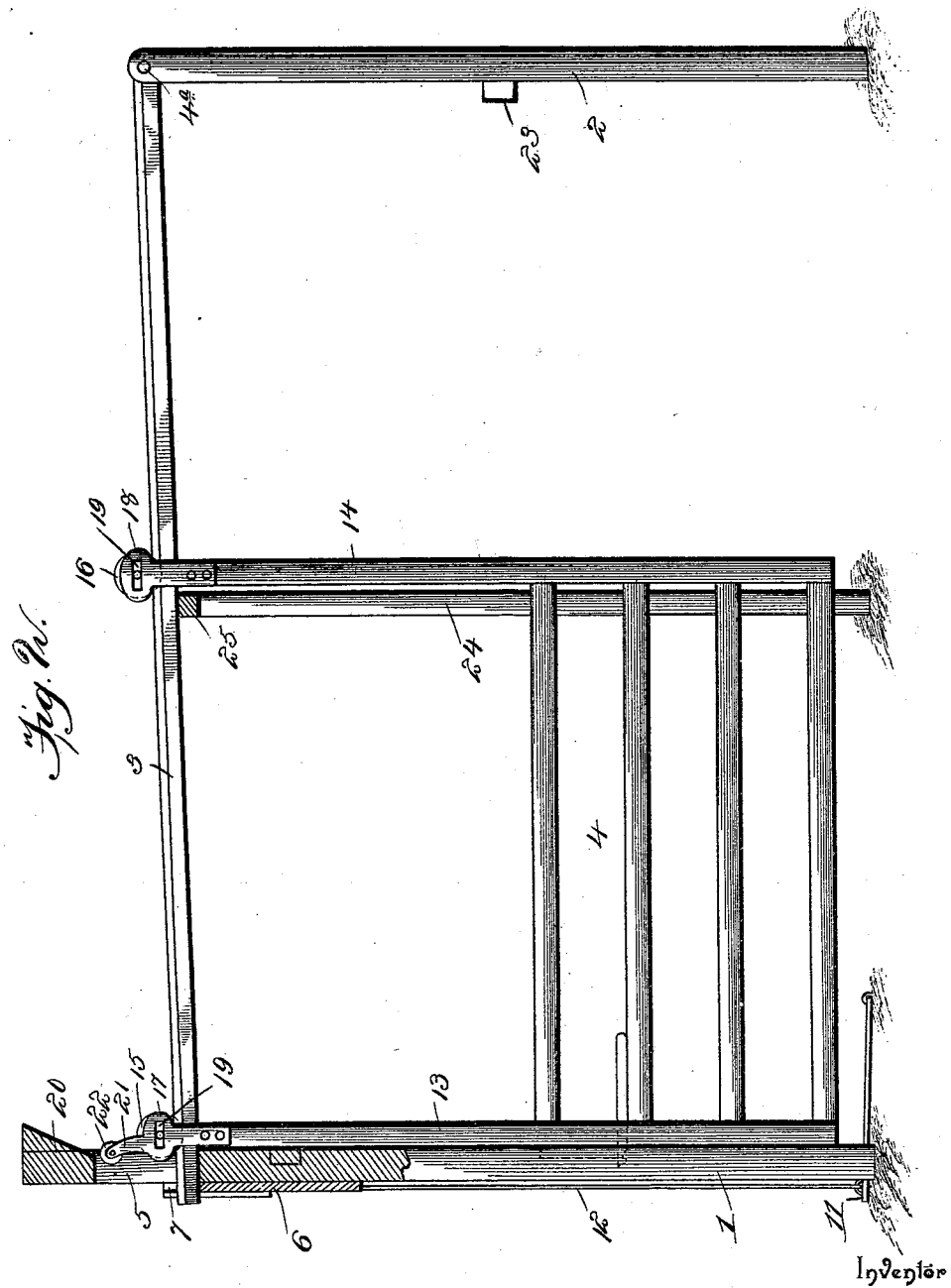

In the drawings—Figure 1 is a perspective view of a sliding gate constructed in accordance with this invention. Fig. 2 is a view partly in elevation, and partly in longitudinal section.

Like numerals of reference indicate corresponding parts in both the figures of the drawings.

1 and 2 designate uprights of a frame, which is provided with a track bar 3 having a gate 4 suspended from it and adapted to have one of its ends raised and lowered to form opposite inclines, whereby the gate will be caused to open and close by gravity. The track bar 3 has its rear end pivoted in a bifurcation of the upper end 4 of the upright 2, and its other end is arranged in a vertical slot or opening 5 of the upright 1, and is supported by a sliding bar 6. The sliding bar 6 is vertically disposed in suitable ways 7 of the upright 1, and is provided at its lower end with oppositely disposed recesses 8 receiving the inner ends of operating levers 9, which are fulcrumed on arms 10 of the frame formed by a cross-bar thereon. The operating levers extend from the gate in opposite directions in order to be within convenient reach at either approach to the gate, and they are adapted to elevate the adjacent end of the track bar to form a downward incline from the upright 1 to cause the gate to open by gravity, and they are adapted to lower the track bar to form an incline in the opposite direction to cause the gate to close by gravity. In closing the gate a wheel of a vehicle may be brought in contact with either one of a pair of levers 11 arranged at the base of the upright 1. Each lever 11 is fulcrumed at one end, and is connected by a rod 12 with the adjacent operating lever. The lower end of the rod 12 is connected to the upper end of the lever 11, and the upper end of the rod 12 is secured to the adjacent operating lever at a point near the inner end thereof. By depressing the lever 11, the inner ends of the operating levers are forced downward, carrying with them the vertically disposed slide 6, and thereby lowering the free end of the track bar.

The gate, which may be of any desired construction, and which may be provided with any suitable latch, is suspended from the track bar by its end bars 13 and 14, which are provided at their upper ends with rollers 15 and 16 arranged on the track bar and preferably grooved to receive a ridge or flange of the track bar. The rollers 15 and 16 are journaled in plates 17 and 18 of the gate bars; and the plates 17 and 18 are provided with elongated openings or slots 19 to receive the journals of the rollers.

In order to render the opening of the gate positive and reliable a wedge-shaped block or projection 20 is secured to the upright 1 above the track bar. The plates 17 are provided with upward and forward extending arms 21, between which is journaled a roller 22 adapted, when the gate is closed and the track bar is being lifted, to engage the wedge-shaped block or projection 20; and by such engagement the gate is given a positive push to cause it to open.

The rear upright 2 of the supporting frame is provided intermediate of its ends with a projection or block 23 forming a fulcrum for the gate and holding the lower end or bottom of the gate away from the upright 2, whereby when the track bar is lowered for closing the gate the bottom of the gate will swing rearward on the fulcrum in the direction of the upright 2 in order to give the top of the gate an onward push to start it down the incline.

The gate is supported and guided by a brace at the center of the supporting frame composed of vertical bars 24 arranged on opposite sides of the gate and having their upper ends connected by a cross piece 25.

It will be seen that the gate is exceedingly simple and inexpensive in construction, that it is adapted to be opened and closed with a minimum amount of force, and that the operation of opening and closing is rendered positive and reliable.

Changes in the form, proportion, and the minor details of construction may be resorted to without departing from the principle or sacrificing any of the advantages of this invention.

What I claim is—

1. The combination of an upright 2, an upright 1 provided at its top with an opening arranged vertically, a track bar pivoted to the upright 2 and arranged in the opening of the upright 1, a vertically movable slide mounted in suitable ways on the track bar and provided at its lower end at opposite sides with recesses, operating levers engaging the recesses and adapted to raise and lower the slide, a sliding gate suspended from the track bar, a pair of levers arranged at the base of the upright 1 and located on opposite sides thereof and each fulcrumed at one end, and rods connecting the other ends of the latter with the operating levers, substantially as described.

2. The combination of a supporting frame provided with a track bar pivoted at one end and having its other end loosely mounted and adapted to be raised and lowered to form opposite inclines, means for raising and lowering the track bar, a sliding gate suspended from the track bar, and a stationary wedge-shaped projection arranged on the frame and located above the movable end of the track bar to be engaged by the gate, whereby the latter is given a push to start it, substantially as described.

3. The combination of a supporting frame provided with a track bar pivoted at one end and loosely mounted at the other end, means for raising and lowering the loosely mounted end of the track bar, a stationary wedge-shaped projection mounted on the frame and located above the movable end of the track bar, a gate slidingly mounted on and depending from the track bar and provided with arms extending above the track bar, and a roller journaled between said arms and arranged to engage the wedge-shaped projection, substantially as and for the purpose described.

4. The combination of a supporting frame having a track bar pivoted at one end and loosely mounted at the other end, means for raising and lowering the loosely mounted end of the track bar, a sliding gate suspended from the track bar, and a projection arranged on the frame below the pivoted end of the track bar to hold the bottom of the gate away from the adjacent portion of the frame and adapted to form a fulcrum for the gate to start the same, substantially as described.

5. The combination of a supporting frame, a track bar pivoted at one end to the frame and having its other end slidingly mounted and adapted to be raised and lowered, means for raising and lowering the loosely mounted end of the track bar, a stationary wedge-shaped projection arranged above the loosely mounted end of the track bar, a projection 23 mounted on the frame and located below the pivoted end of the track bar, and a sliding gate depending from the track bar and provided with a projecting roller located above the track bar and arranged to engage the wedge-shaped projection, substantially as described.

In testimony that I claim the foregoing as my own I have hereto affixed my signature in the presence of two witnesses.

STANSBURY J. SMITH.

Witnesses:
E. G. SIGGERS,
HORACE G. PIERSON.